(12) United States Patent
Lee

(10) Patent No.: US 8,396,666 B2
(45) Date of Patent: Mar. 12, 2013

(54) NAVIGATION SYSTEMS AND ROUTE PLANNING METHODS THEREOF

(75) Inventor: Ai-Chieh Lee, Taipei (TW)

(73) Assignee: Mitac International Corp., Taoyuan (TW)

( * ) Notice: Subject to any disclaimer, the term of this patent is extended or adjusted under 35 U.S.C. 154(b) by 732 days.

(21) Appl. No.: 12/352,558

(22) Filed: Jan. 12, 2009

(65) Prior Publication Data

US 2010/0036602 A1 Feb. 11, 2010

(30) Foreign Application Priority Data

Aug. 7, 2008 (TW) ............................... 97130035 A

(51) Int. Cl.
*G01C 21/34* (2006.01)
(52) U.S. Cl. ............ 701/533; 701/23; 701/26; 701/410; 701/411
(58) Field of Classification Search .................. None
See application file for complete search history.

(56) References Cited

U.S. PATENT DOCUMENTS

| | | | |
|---|---|---|---|
| 5,928,307 A * | 7/1999 | Oshizawa et al. | 701/210 |
| 7,266,448 B2 * | 9/2007 | Park et al. | 701/412 |
| 2003/0093217 A1 * | 5/2003 | Petzold et al. | 701/201 |
| 2009/0164115 A1 * | 6/2009 | Kosakowski et al. | 701/201 |
| 2011/0144904 A1 * | 6/2011 | Pinkus et al. | 701/201 |

* cited by examiner

*Primary Examiner* — Faris Almatrahi

(57) ABSTRACT

Route planning methods for navigating an electronic device having a navigation system from a starting point to a destination are disclosed. The method comprises the following steps. First, current position of the electronic device is acquired. Next, a decision point corresponding to the current position is obtained in a planned route in which the decision point has a dedicated moving direction which is planned by the planned route and a plurality of possible moving directions. Accordingly, pluralities of candidate routes, destined to the destination, corresponding to the possible moving directions are generated. Next, the electronic device is navigated to the destination using the planned route or one of the candidate routes.

14 Claims, 4 Drawing Sheets

NAVIGATION SYSTEMS AND ROUTE PLANNING METHODS THEREOF

CROSS REFERENCE TO RELATED APPLICATIONS

This Application claims priority of Taiwan Patent Application No. 097130035, filed on Aug. 7, 2008, the entirety of which is incorporated by reference herein.

BACKGROUND OF THE INVENTION

1. Field of the Invention

The disclosure relates generally to route planning methods and related navigation systems, and, more particularly to route planning methods and related navigation systems that provide fast route re-planning.

2. Description of the Related Art

Global Positioning System (GPS) technology has been widely used in navigation systems of various electronic devices, such as portable devices and electronic devices in cars to receive signals from GPS satellites. Accordingly, the position of an electronic device with a GPS receiver therein, can be determined according to responsive positioning signals between the electronic device and the satellites. Users may also use navigation software in the electronic device for route planning and navigation.

Generally, when users desire to move from a starting point to a destination, the navigation software may plan a suggested route therebetween, according to a specific algorithm for guiding the users in a particular direction. Meanwhile, when users deviate from the calculated particular direction, a route re-planning process will be activated to plan a new route from the new position of the electronic device to the destination. The operation for the route re-planning process, however, has to consider various factors, such as distances between two points and the complexity of surrounding roads, such that the operation may be time consuming. In such a situation, before the route re-planning process is completed, users may have already traveled in a wrong direction be lost.

It is therefore an important objective to shorten the calculation time for the route re-planning process.

BRIEF SUMMARY OF THE INVENTION

Route planning methods and related navigation systems are provided.

In an embodiment of a route planning method for use in an electronic device having a navigation system for navigating from a starting point to a destination, current position of the electronic device is first acquired. A decision point corresponding to the current position is obtained in a planned route, wherein the decision point has a dedicated moving direction which is planned by the planned route and a plurality of possible moving directions. Pluralities of candidate routes, destined to the destination, corresponding to the possible moving directions are accordingly generated. The electronic device is navigated to the destination by utilizing the planned route or one of the candidate routes.

An embodiment of a navigation system for use in an electronic device comprises a display unit, a processing unit and a route planning unit. The processing unit acquires current position of the electronic device and obtains a decision point corresponding to the current position in a planned route, wherein the decision point has a dedicated moving direction which is planned by the planned route and a plurality of possible moving directions. The route planning unit generates a plurality of candidate routes, destined to the destination, corresponding to the possible moving directions. The processing unit navigates the electronic device to the destination by utilizing the planned route or one of the candidate routes when moving through the decision point.

In another embodiment of a route planning method for use in an electronic device having a navigation system for navigating from a starting point to a destination, a first route is planned according to the starting point and the destination, and the first route comprises at least one decision point, and the decision point has a dedicated moving direction which is planned by the first route and a plurality of possible moving directions. Pluralities of second candidate routes, destined to the destination, corresponding to the possible moving directions are pre-planned when moving between the starting point and the decision point. When moving through the decision point and deviating from the dedicated moving direction planned by the first route, a replacement route is selected from the second candidate routes to replace the first route and the electronic device is navigated to the destination utilizing the replacement route.

Route planning methods and navigation systems may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Embodiments of the invention provide a navigation system and related route planning method for use in an electronic device such that when the electronic device is moving to a path or a direction that is deviated from original planned route, another pre-planned route can be quickly used to replace the original one for navigation thereby reducing the calculation time for the route re-planning process.

Figure 1:
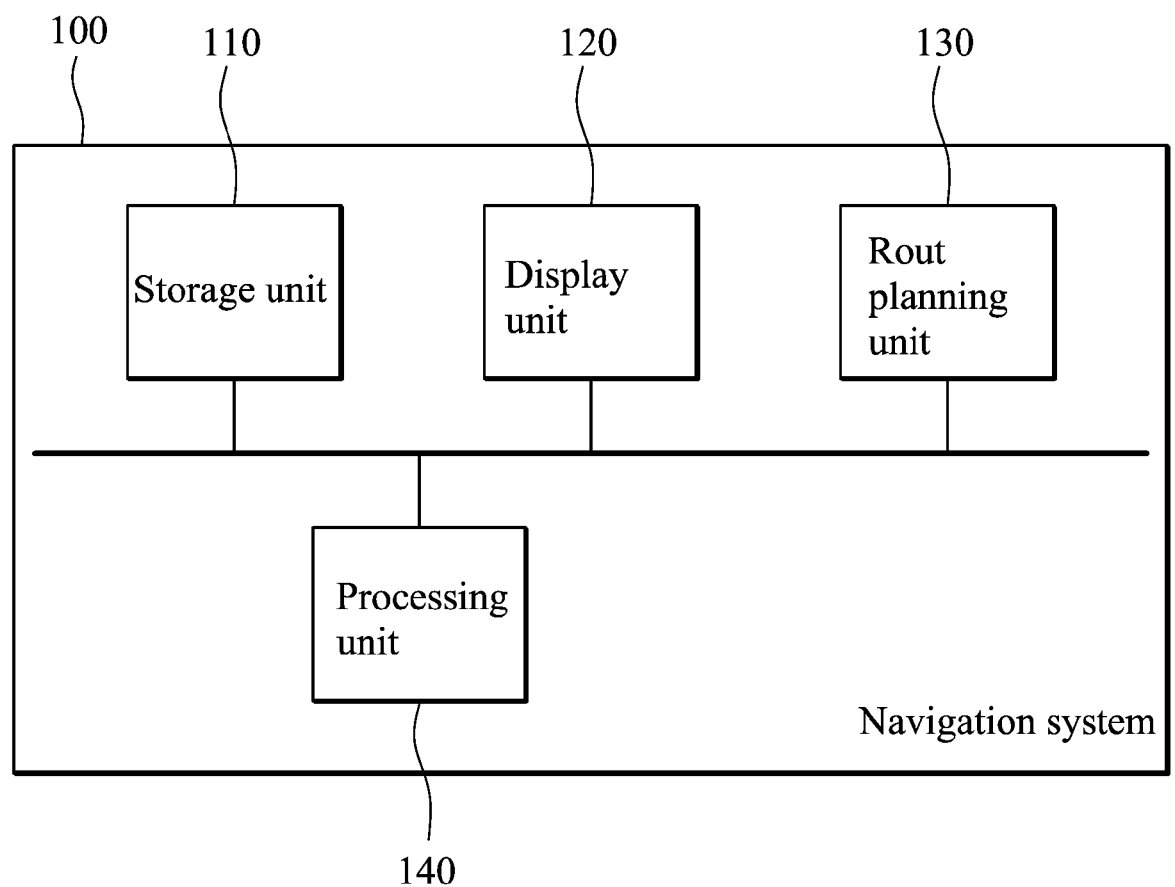
FIG. 1 is a schematic diagram illustrating an embodiment of a navigation system of the invention.

FIG. 1 is a schematic diagram illustrating an embodiment of a navigation system of the invention. The navigation system is suitable for use in an electronic device, such as a computer system or a portable device having a navigation function.

The navigation system 100 comprises a storage unit 110, a display unit 120, a route planning unit 130 and a processing unit 140. The storage unit 110 comprises map data corresponding to at least one specific region, such as an area or a country. The map data may comprise doorplate addresses, landmarks, scenic spots, and/or road and information thereof.

The display unit 120 displays related data, such as a user interface, route planning results, and related navigation information. The processing unit 140 may be a navigation engine having a route planning capability. Users may input navigation parameters, such as a starting point, a destination, and/or at least one mid-point via the user interface. The processing unit 140 performs route planning according to the navigation parameters such as the starting point, the mid-point and the destination to obtain at least one route planning result. Users may be navigated to the destination according to a planned route which is obtained by the route planning result. It is noted that, the navigation system 100 may further comprise a signal receiving unit (not shown) to receive satellite signals. The processing unit 140 may then calculate current position of the electronic device based on the received signals. The route planning unit 130 may obtain a decision point C in the planned route according to the current position of the electronic device, pre-plan other routes to the destination corresponding to all other possible moving directions of the decision point and store all the planned routes to the storage unit 110. The decision point C has a dedicated moving direction planned by the planned route and multiple possible moving directions other than the dedicated moving direction. For example, please refer to FIGS. 2A and 2B.

Figure 2A:
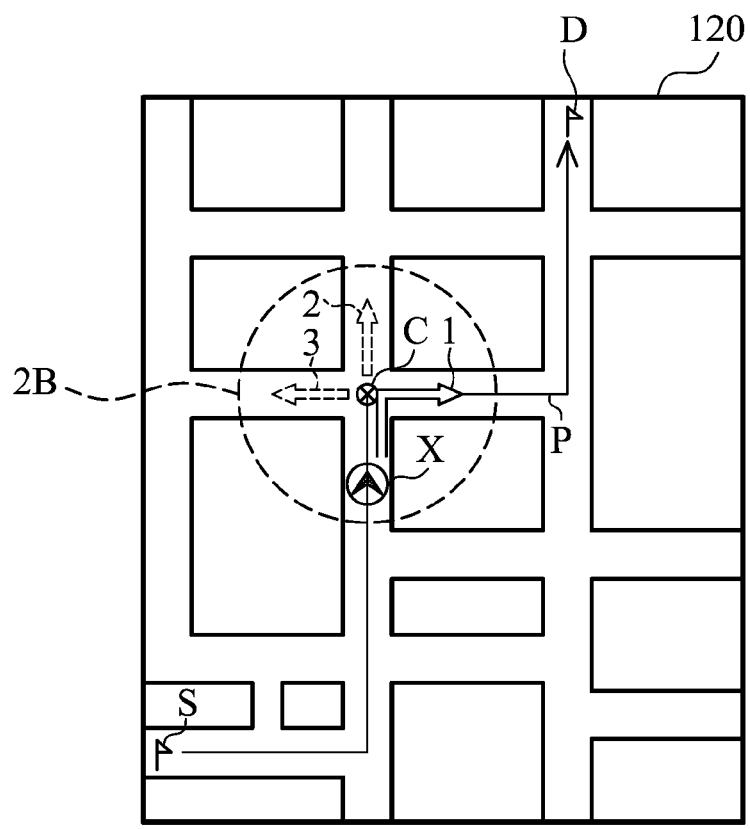
FIGS. 2A and 2B are schematic diagrams illustrating embodiments of route planning results of the invention.
Figure 2B:
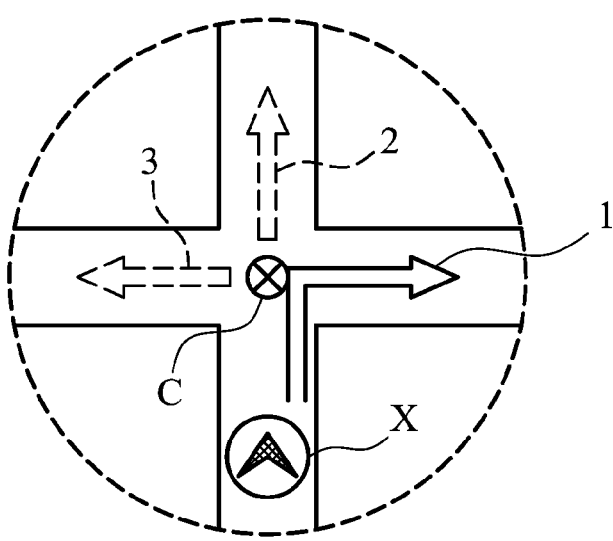

FIGS. 2A and 2B are schematic diagrams illustrating embodiments of route planning results of the invention. As shown in FIG. 2A, the display unit 120 displays a planned route P from a starting point S to the destination D in which symbol X represents a current position of the electronic device and symbol C represents a decision point. It is noted that, in the example of FIG. 2A, the decision point C is set to be an intersection next to the current position of the electronic device and thus multiple possible moving directions may appear for the electronic device to move to while it is moving through the decision point C. As shown in FIG. 2B, in addition to a dedicated moving direction 1 (right turn), the decision point C further has possible moving directions, i.e. moving direction 2 (go straight) and moving direction 3 (left turn). In other words, the electronic device may move forward by following the moving direction 1, 2 or 3 while it is moving through the decision point C. When the current position of the electronic device conforms to the route planning result, the processing unit 140 may proceed to provide the navigation function to move the electronic device to the destination (i.e. destination D) according to the original route planning result. When the current position of the electronic device does not conform to or is deviated from the route planning result, the processing unit 140 may re-perform the route planning according to the current position of the electronic device. Meanwhile, the processing unit 140 performs the route planning method of the invention.

Figure 3:
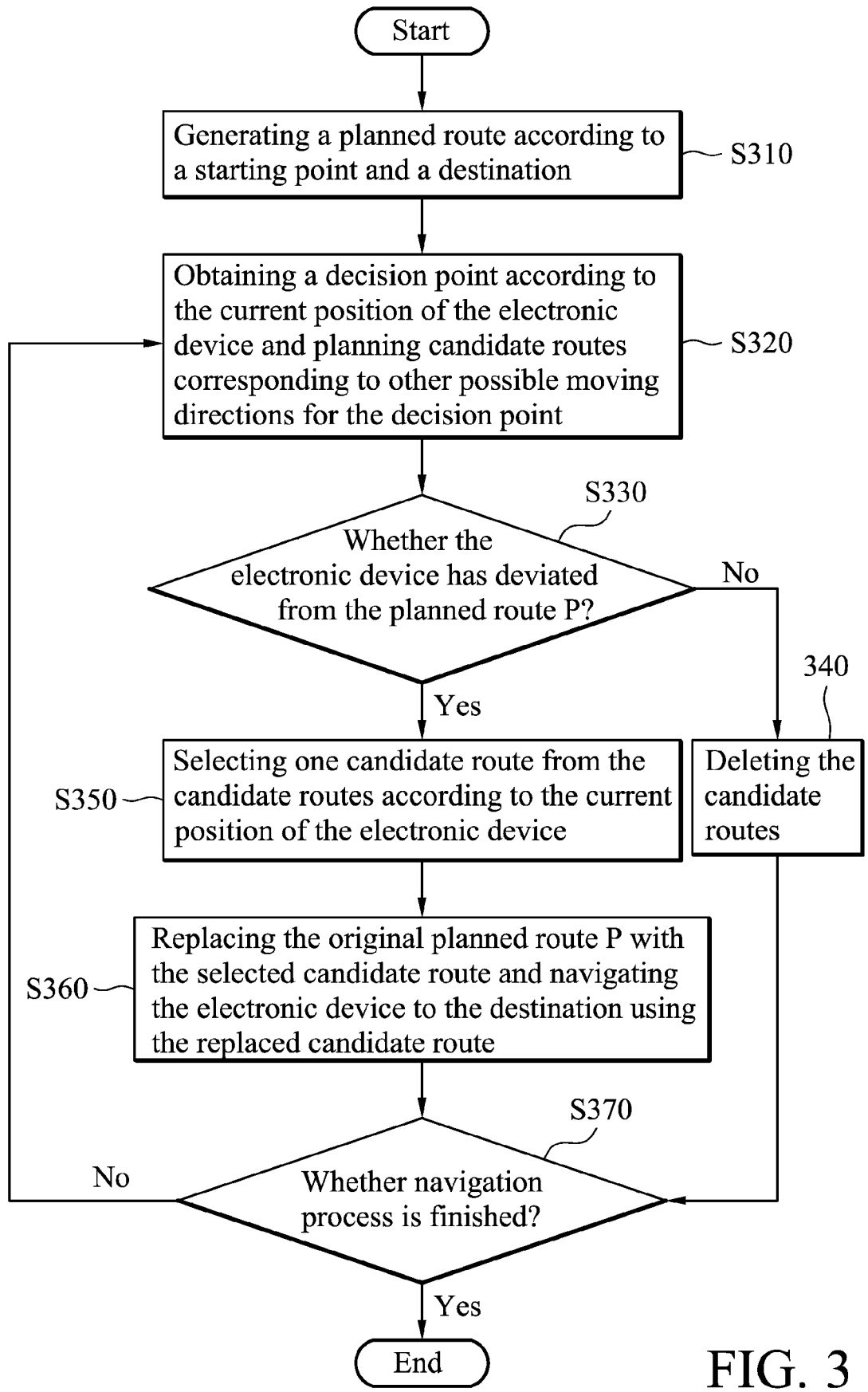
FIG. 3 is a flowchart of an embodiment of a route planning method of the invention.

FIG. 3 is a flowchart of an embodiment of a route planning method of the invention. The route planning method is suitable for use in an electronic device, such as a computer system or a portable device having a navigation function.

In step S310, a planned route P is generated according to a starting point and a destination set by the user. In step S320, a decision point is obtained according to the current position of the electronic device and candidate routes corresponding to other possible moving directions are planned for the decision point. Each candidate route is a route planned from a corresponding moving direction to the destination. When moving through the decision point, in step S330, it is determined whether the electronic device has deviated from the planned route P. If the electronic device has not deviated from (i.e. follows) the planned route P (No in step S330), in step S340, all of the candidate routes are deleted and step S370 is further performed. If the electronic device has deviated from the planned route P (Yes in step S330), i.e. the moving direction of the electronic device has not followed the dedicated moving direction, in step S350, one candidate route is selected from the candidate routes to be a replacement route according to the current position of the electronic device and, in step S360, the original planned route P is replaced with the selected candidate route (i.e. the replacement route) and the electronic device is navigated to the destination using the replaced candidate route. It is then determine, in step S370, whether the navigation process is finished. That is, whether the destination has been reached. If the navigation process is finished (Yes in step S370), the procedure ends. If the navigation process is not finished (No in step S370), step S320 is performed for proceeding to obtain a next decision point according to the current position of the electronic device and plan candidate routes corresponding to other possible moving directions of the next decision point.

Figure 4A:
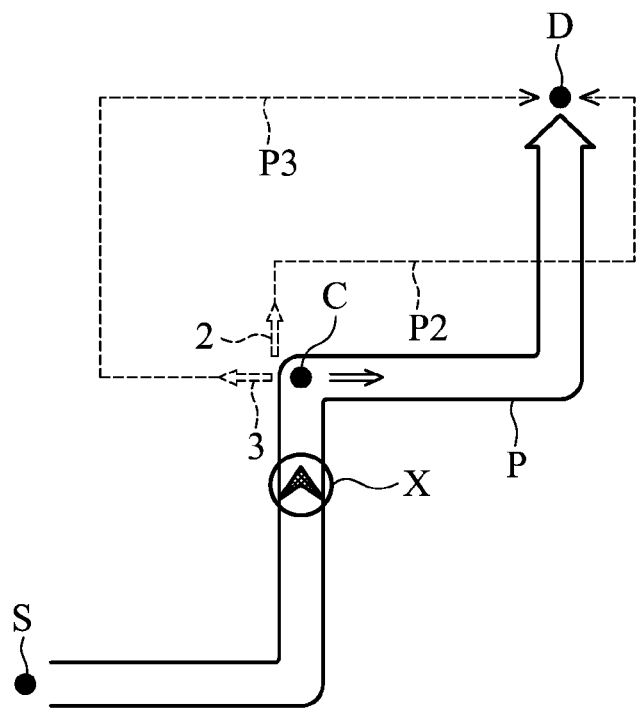
FIGS. 4A and 4B are schematic diagrams illustrating embodiments of route planning of the invention.
Figure 4B:
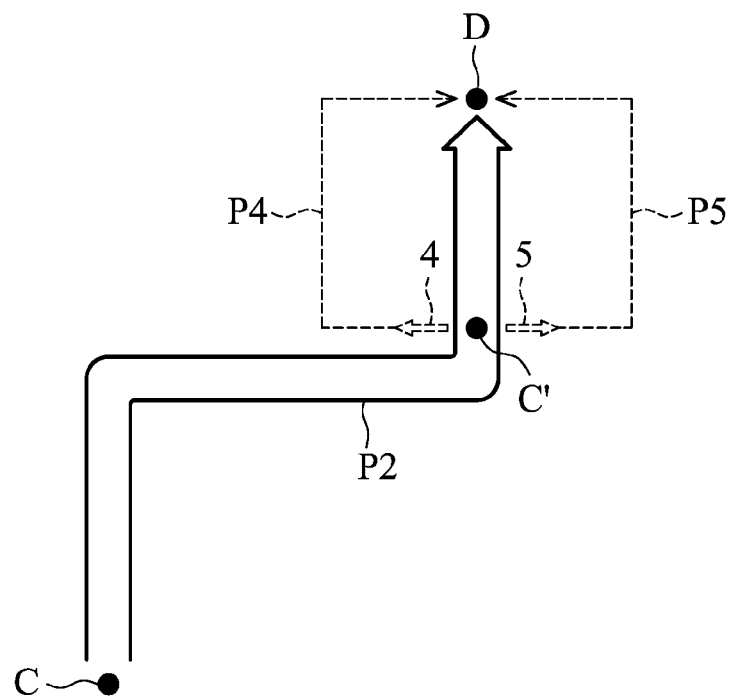

For example, please refer to FIGS. 4A and 4B. FIGS. 4A and 4B are schematic diagrams illustrating other embodiments of route planning of the invention. As shown in FIG. 4A, a planned route P from a starting point S to a destination D is displayed in which symbol X represents a current position of the electronic device and symbol C represents a decision point. The decision point C has a dedicated moving direction 1 planned by the planned route P and possible moving directions 2 and 3. Accordingly, the route planning unit 130 generates two candidate routes P2 and P3 destined to the destination D respectively corresponding to the moving directions 2 and 3 when the electronic device is moving between the starting point S and the decision point C. The candidate routes P2 and P3 are then pre-stored in the storage unit 110. If the electronic device moves forward by following the dedicated moving direction 1 while moving through the decision point C, the course of the planned route is determined to have not been deviated from and thus the pre-planned candidate routes P2 and P3 can be deleted or removed from the storage unit 110. The electronic device is then proceeded to navigate to the destination D according to the original planned route P.

On the contrary, if the electronic device moves forward by following the moving direction 2 or 3 while moving through the decision point C, the course of the planned route is determined to have been deviated from and thus one of the pre-planned candidate routes P2 and P3 may be selected as a replacement route according to the current position of the electronic device to replace the original planned route P and the electronic device is then proceeded to navigate to the destination D according to the replaced candidate route P2 or P3.

As shown in FIG. 4B, assuming that the electronic device moves forward following the moving direction 2 while moving through the decision point C, the course of the planned route is determined to have been deviated from and thus the processing unit 140 automatically selects the candidate route P2 as a replacement route to replace the original planned route P based on the calculated current position for further navigation. Similarly, the route planning unit 130 generates two candidate routes P4 and P5 destined to the destination D respectively corresponding to the moving directions 4 and 5 when the electronic device is moving between the decision point C and a next decision point C'. The candidate routes P4 and P5 are then pre-stored in the storage unit 110. If the electronic device moves forward following the dedicated moving direction while moving through the decision point C', the pre-planned candidate routes P2 and P3 can be deleted or removed from the storage unit 110 and the electronic device is proceeded to navigate to the destination D according to the original planned route P2. If the electronic device moves forward following the moving direction 4 or 5 while moving through the decision point C', the course of the planned route is determined to have been deviated from and thus one of the pre-planned candidate routes P4 and P5 may be selected as a replacement route to replace the original planned route P2 according to the current position of the electronic device and the electronic device is then proceeded to navigate to the destination D according to the replaced candidate route P4 or P5.

In summary, according to the navigation system and related route planning method of the invention, a decision point that has various possible moving directions can be obtained according to the current position of the electronic device. Additionally, all routes to the destination corresponding to the various possible moving directions can be planned in advance so that one of the pre-planned routes may be used as a replacement route to immediately replace an original route without any calculation for route re-planning when the electronic device is moved through the decision point and then deviated from the originally planned route. Therefore, the time needed for the route re-planning process may be significantly reduced.

Navigation systems and route planning method thereof, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A route planning method for use in an electronic device having a navigation system for navigating from a starting point to a destination, comprising:
    acquiring current position of the electronic device;
    obtaining a decision point corresponding to the current position in a planned route, wherein the decision point has a dedicated moving direction which is planned by the planned route and a plurality of possible moving directions;
    generating a plurality of candidate routes, destined to the destination, corresponding to all of the possible moving directions; and
    navigating the electronic device to the destination by utilizing the planned route or one of the candidate routes, wherein the candidate routes to the destination corresponding to all of the possible moving directions are planned in advance so that one of the pre-planned candidate routes is used as a replacement route to immediately replace the originally planned route without any calculation for route re-planning when moving through the decision point and deviating from the dedicated moving direction planned by the planned route.

2. The route planning method of claim 1, wherein the candidate routes are generated when moving between the starting point and the decision point.

3. The route planning method of claim 1, wherein the step of navigating the electronic device to the destination by utilizing the planned route or one of the candidate routes further comprises:
    proceeding to navigate the electronic device to the destination utilizing the planned route when moving through the decision point and following the dedicated moving direction planned by the planned route.

4. The route planning method of claim 3, further comprising:
    generating a plurality of second candidate routes, destined to the destination, corresponding to possible moving directions of a next decision point that is located between the decision point and the destination; and
    replacing the planned route with one of the second candidate routes and navigating the electronic device to the destination utilizing the replaced second candidate route when moving through the next decision point and deviating from the dedicated moving direction planned by the planned route.

5. A navigation system for use in an electronic device, comprising:
    a display unit;
    a processing unit, acquiring current position of the electronic device and obtaining a decision point corresponding to the current position in a planned route, wherein the decision point has a dedicated moving direction which is planned by the planned route and a plurality of possible moving directions; and
    a route planning unit, generating a plurality of candidate routes, destined to the destination, corresponding to all of the possible moving directions,
    wherein the processing unit navigates the electronic device to the destination by utilizing the planned route or one of the candidate routes when moving through the decision point and wherein the candidate routes to the destination corresponding to all of the possible moving directions are planned in advance so that the processing unit selects one of the pre-planned candidate routes as a replacement route to immediately replace the originally planned route without any calculation for route re-planning and navigates the electronic device to the destination utilizing the selected candidate route when moving through the decision point and deviating from the dedicated moving direction planned by the planned route.

6. The navigation system of claim 5, wherein the candidate routes are generated by the route planning unit while moving between the starting point and the decision point.

7. The navigation system of claim 5, wherein the processing unit deletes the candidate routes and proceeds to navigate the electronic device to the destination utilizing the planned route when moving through the decision point and following the dedicated moving direction planned by the planned route.

8. The navigation system of claim 7, wherein the route planning unit further generates a plurality of second candidate routes, destined to the destination, corresponding to possible moving directions of a next decision point that is located between the decision point and the destination and, when moving through the next decision point and deviating from the dedicated moving direction planned by the planned route, the processing unit replaces the planned route with one of the second candidate routes and navigates the electronic device to the destination utilizing the replaced second candidate route.

9. A route planning method for use in an electronic device having a navigation system for navigating from a starting point to a destination, comprising:
   planning a first route according to the starting point and the destination, wherein the first route comprises at least one decision point, and the decision point has a dedicated moving direction which is planned by the first route and a plurality of possible moving directions;
   pre-planning a plurality of second candidate routes, destined to the destination, corresponding to the possible moving directions when moving between the starting point and the decision point; and
   selecting a replacement route from the second candidate routes to immediately replace the first route without any calculation for route re-planning and navigating the electronic device to the destination utilizing the replacement route when moving through the decision point and deviating from the dedicated moving direction planned by the first route.

10. The route planning method of claim 9, wherein the step of selecting a replacement route from the second candidate routes further comprises:
   acquiring current position of the electronic device; and
   obtaining the replacement route from the second candidate routes according to the current position of the electronic device.

11. The route planning method of claim 10, further comprising:
   obtaining a first decision point corresponding to the current position, wherein the first decision point has a dedicated moving direction which is planned by the replacement route and a plurality of possible moving directions;
   planning a plurality of third candidate routes, destined to the destination, corresponding to the possible moving directions; and
   replacing the replacement route with one of the third candidate routes and navigating to the destination utilizing the replaced third candidate route when moving through the decision point and deviating from the dedicated moving direction planned by the replacement route.

12. The route planning method of claim 9, further comprising:
   deleting the second candidate routes and proceeding to navigate to the destination utilizing the first route when moving through the decision point and following the dedicated moving direction planned by the first route.

13. The route planning method of claim 12, further comprising:
   planning a plurality of third candidate routes, destined to the destination, corresponding to possible moving directions of a next decision point that is located between the decision point and the destination; and
   replacing the first route with one of the third candidate routes and navigating to the destination utilizing the replaced third candidate route when moving through the next decision point and deviating from the dedicated moving direction planned by the first route.

14. A non-transitory machine-readable storage medium comprising a computer program, which, when executed, causes a device to perform a route planning method, and the method comprising:
   generating a planned route, wherein the device performs a navigation process according to the planned route;
   acquiring current position of the device;
   obtaining a decision point corresponding to the current position in the planned route, wherein the decision point has a dedicated moving direction which is planned by the planned route and a plurality of possible moving directions;
   generating a plurality of candidate routes, destined to the destination, corresponding to all of the possible moving directions; and
   navigating the device to the destination by utilizing the planned route or one of the candidate routes,
   wherein the candidate routes to the destination corresponding to all of the possible moving directions are planned in advance so that one of the pre-planned candidate routes is used as a replacement route to immediately replace the originally planned route without any calculation for route re-planning when moving through the decision point and deviating from the dedicated moving direction planned by the planned route.

* * * * *